United States Patent
Hsieh

(10) Patent No.: US 10,477,482 B2
(45) Date of Patent: Nov. 12, 2019

(54) METHOD OF HANDLING ON-OFF STATE OF A CELL AND RELATED COMMUNICATION DEVICE

(71) Applicant: ACER INCORPORATED, New Taipei (TW)

(72) Inventor: Chia-Wen Hsieh, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 140 days.

(21) Appl. No.: 14/709,448

(22) Filed: May 11, 2015

(65) Prior Publication Data

US 2015/0334660 A1 Nov. 19, 2015

Related U.S. Application Data

(60) Provisional application No. 61/992,262, filed on May 13, 2014.

(51) Int. Cl.
*H04W 72/04* (2009.01)
*H04W 52/02* (2009.01)
*H04L 5/00* (2006.01)

(52) U.S. Cl.
CPC ... *H04W 52/0274* (2013.01); *H04W 52/0206* (2013.01); *H04W 72/042* (2013.01);
(Continued)

(58) Field of Classification Search
CPC ......... H04W 52/0274; H04W 52/0206; H04W 72/042; H04W 72/0453; H04W 72/0446; H04W 52/146; H04W 72/1289; H04W 76/28; H04W 72/0406; H04W 72/0413; H04L 5/001; H04L 5/0053; H04L 1/1671; H04L 1/1861; H04L 5/0048; H04L 5/0055; H04L 5/14
See application file for complete search history.

(56) References Cited

U.S. PATENT DOCUMENTS

2011/0269492 A1* 11/2011 Wang ............... H04L 5/003
455/509
2012/0127938 A1* 5/2012 Lv .................. H04W 72/1205
370/329
(Continued)

FOREIGN PATENT DOCUMENTS

WO 2012154955 11/2012
WO 2014044436 A1 3/2014

OTHER PUBLICATIONS

HTC, Control Signalling Reduction for Improved Spectral Efficiency, 3GPP TSG RAN WG1 Meeting #72bis, Apr. 15-19, 2013, R1-131208, Chicago, USA, XP050697120.
(Continued)

*Primary Examiner* — Sai Aung
(74) *Attorney, Agent, or Firm* — Winston Hsu

(57) ABSTRACT

A method of handling an on-off state of a cell for a communication device comprises receiving a first downlink (DL) control information (DCI) in a first subframe from a network, wherein the first DCI indicates at least one first on-off state of at least one first subframe of a first cell of the network; and determining an on-off state of a second subframe of the first cell according to the first DCI, wherein the at least one first subframe comprises the second subframe.

12 Claims, 13 Drawing Sheets

(52) U.S. Cl.
CPC .......... *H04L 5/0053* (2013.01); *H04L 5/0091* (2013.01); *Y02D 70/1242* (2018.01); *Y02D 70/1262* (2018.01); *Y02D 70/1264* (2018.01); *Y02D 70/21* (2018.01)

(56) References Cited

U.S. PATENT DOCUMENTS

| | | | |
|---|---|---|---|
| 2012/0300715 A1 | 11/2012 | Pelletier | |
| 2013/0279462 A1* | 10/2013 | He | H04W 72/042 370/329 |
| 2013/0336252 A1* | 12/2013 | Hsieh | H04L 5/0053 370/329 |
| 2014/0301299 A1* | 10/2014 | Wu | H04L 5/0053 370/329 |
| 2014/0378157 A1* | 12/2014 | Wei | H04W 16/14 455/454 |
| 2015/0189574 A1* | 7/2015 | Ng | H04W 24/08 370/252 |
| 2015/0264708 A1* | 9/2015 | Li | H04W 28/06 370/329 |
| 2015/0271692 A1* | 9/2015 | Han | H04L 5/0098 370/252 |
| 2016/0081110 A1* | 3/2016 | Suzuki | H04W 52/0229 370/336 |
| 2016/0095093 A1* | 3/2016 | Yi | H04L 5/001 370/280 |
| 2016/0142898 A1* | 5/2016 | Poitau | H04W 76/14 370/329 |
| 2016/0174155 A1* | 6/2016 | Nagata | H04W 52/0235 370/311 |
| 2016/0192433 A1* | 6/2016 | Deenoo | H04W 72/046 370/329 |

OTHER PUBLICATIONS

Nvidia, Small cell on/off transition time reduction, 3GPP TSG-RAN WG1 #77, May 19-23, 2014, R1-142309, Seoul, Korea, XP050814347.

Coolpad, Discussion on small cell on/off transition time reduction, 3GPP TSG RAN WG1 Meeting #77, May 19-23, 2014, R1-142412, XP050814842, Seoul, Korea.

ZTE, Discussion on open issues of small cell on/off and discovery, 3GPP TSG RAN WG1 Meeting #76bis, Mar. 31-Apr. 4, 2014, R1-141405, XP050787075, Shenzhen, China.

Alcatel-Lucent et al., Remaining Issues on CIF Configuration and Mapping, 3GPP TSG-RAN WG1 #61bis, Jun. 28-Jul. 2, 2010, R1-104077, XP050449373, Dresden, Germany.

\* cited by examiner

METHOD OF HANDLING ON-OFF STATE OF A CELL AND RELATED COMMUNICATION DEVICE

CROSS REFERENCE TO RELATED APPLICATIONS

This application claims the benefit of U.S. Provisional Application No. 61/992,262, filed on May 13, 2014 and incorporated herein by reference.

BACKGROUND OF THE INVENTION

1. Field of the Invention

The present invention relates to a method used in a wireless communication system and related communication device, and more particularly, to a method of handling an on-off state of a cell and related communication device.

2. Description of the Prior Art

A long-term evolution (LTE) system supporting the 3rd Generation Partnership Project (3GPP) Rel-8 standard and/ or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, increases peak data rate and throughput, and includes advanced techniques, such as carrier aggregation (CA), coordinated multipoint (CoMP) transmissions/reception, uplink (UL) multiple-input multiple-output (UL-MIMO), licensed-assisted access (LAA) using LTE, etc. For a UE and an eNB to communicate with each other in the LTE-A system, the UE and the eNB must support standards developed for the LTE-A system, such as the 3GPP Rel-10 standard or later versions.

The UE may need to monitor control channels of cells of the eNB, when the UE communicates with the eNB via the cells, i.e., carrier aggregation (CA) is supported. In certain situations, one or more of the cells may be turned off by the eNB, and the UE does not need to monitor the cell(s) which is turned off and power consumption of the UE can be reduced. The cell(s) which is turned off may be turned on again or a new cell may be turned on (i.e., added) to improve throughput of the UE. However, tens of milliseconds (e.g., 10-60 ms) are needed for switching on-off states of the cells via a higher layer signaling (i.e., network coordination time and/or media access control (MAC) delay). A transition time (i.e., delay) needed for switching the on-off states of the cells is great, and operations of the UE and the eNB are not efficient. Accordingly, throughput of the UE is degraded.

Thus, how to improve efficiency of the switching of the on-off state of the cell is an important problem to be solved.

SUMMARY OF THE INVENTION

The present invention therefore provides a method and related communication device for handling an on-off state of a cell to solve the abovementioned problem.

A method of handling an on-off state of a cell for a communication device comprises receiving a first downlink (DL) control information (DCI) in a first subframe from a network, wherein the first DCI indicates at least one first on-off state of at least one first subframe of a first cell of the network; and determining the on-off state of a second subframe of the first cell according to the first DCI, wherein the at least one first subframe comprises the second subframe.

A method of performing a communication operation via a cell for a communication device comprises receiving a downlink (DL) control information (DCI) in a subframe in a period from a network, wherein the DCI indicates at least one on-off state of at least one subframe in the period of a first cell of the network and the at least one on-off state is specific to the communication device; and performing at least one communication operation in the at least one subframe according to the at least one on-off state.

A method of performing a communication operation via a cell for a communication device comprises receiving information of a number of available DCIs for a first period from a network; receiving a first DCI in a first subframe in a first period from the network and determining that the first subframe of a cell is in an on state specific to the communication device; receiving a second DCI in a second subframe in the first period after the first subframe from the network and determining that the second subframe of the cell is in the on state specific to the communication device, if the number of available DCIs is not achieved; and stopping to receive any DCI in the first period and determining that at least one first subframe of the cell in a rest of the first period is in an off state specific to the communication device, if the number of available DCIs is achieved.

A method of performing a communication operation via a cell for a communication device comprises receiving a first DCI in a first subframe in a first period from a network and determining that the first subframe of a cell is in an on state specific to the communication device; receiving a second DCI in a second subframe in the first period after the first subframe from the network and determining that the second subframe of the cell is in the on state specific to the communication device, if the first DCI indicates an existence of the second DCI; and stopping to receive any DCI in the first period and determining that at least one first subframe of the cell in a rest of the first period is in an off state specific to the communication device, if the first DCI indicates that a next DCI does not exist.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
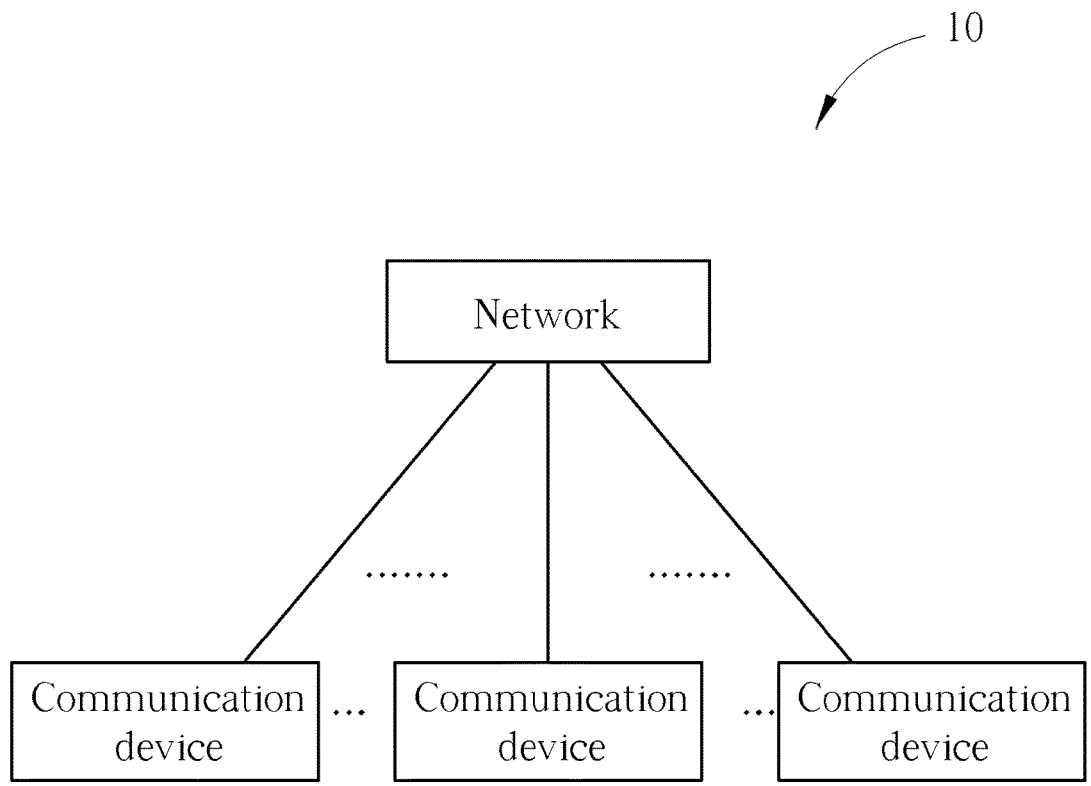
FIG. 1 is a schematic diagram of a wireless communication system according to an example of the present invention.

Please refer to FIG. 1, which is a schematic diagram of a wireless communication system 10 according to an example of the present invention. The wireless communication system 10 is briefly composed of a network and a plurality of communication devices. The wireless communication system 10 may support a time-division duplexing (TDD) mode, a frequency-division duplexing (FDD) mode, a TDD-FDD joint operation mode or a licensed-assisted access (LAA) mode. That is, the network and a communication device may communicate with each other via FDD carrier(s), TDD carrier(s), licensed carrier(s) and/or unlicensed carrier(s). In addition, the wireless communication system 10 may support a carrier aggregation (CA). That is, the network and a communication device may communicate with each other via multiple cells (e.g., multiple carriers) including a primary cell (e.g., primary component carrier) and one or more secondary cells (e.g., secondary component carriers). The abovementioned cells may be operated in the same or different duplexing modes. For example, each cell may be a FDD cell (or TDD cell), when the cells are operated in the same duplexing mode. There are also several scenarios, when the cells are operated in different duplexing modes (e.g. TDD-FDD joint operation). For example, the primary cell may be operated on a TDD carrier, while a secondary cell may be operated on a FDD carrier. In another example, the primary cell may be operated on the FDD carrier, while the secondary cell may be operated on the TDD carrier. In another example, the primary cell may be operated on a licensed carrier, while the secondary cell may be operated on an unlicensed carrier. For the CA conforming to the 3rd Generation Partnership Project (3GPP) long-term evolution (LTE) Rel-10/11/12, 5 cells (e.g., serving cells) may be supported by the communication device and the network. For the CA conforming to the 3GPP LTE Rel-13, 32 cells (e.g., serving cells) may be supported by the communication device and the network.

In FIG. 1, the network and the communication devices are simply utilized for illustrating the structure of the wireless communication system 10. Practically, the network may be a universal terrestrial radio access network (UTRAN) comprising at least one Node-B (NB) in a universal mobile telecommunications system (UMTS). In another example, the network may be an evolved UTRAN (E-UTRAN) including at least one evolved NB (eNB) and/or at least one relay in a long term evolution (LTE) system, a LTE-Advanced (LTE-A) system or an evolution of the LTE-A system.

Furthermore, the network may also include both the UTRAN/E-UTRAN and a core network, wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. In addition, the information may be processed by both the UTRAN/E-UTRAN and the core network, and the decisions are made after coordination and/or cooperation are performed by the UTRAN/E-UTRAN and the core network.

A communication device may be a user equipment (UE), a low cost device (e.g., machine type communication (MTC) device), a device-to-device (D2D) device, a mobile phone, a laptop, a tablet computer, an electronic book, a portable computer system, or combination thereof. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
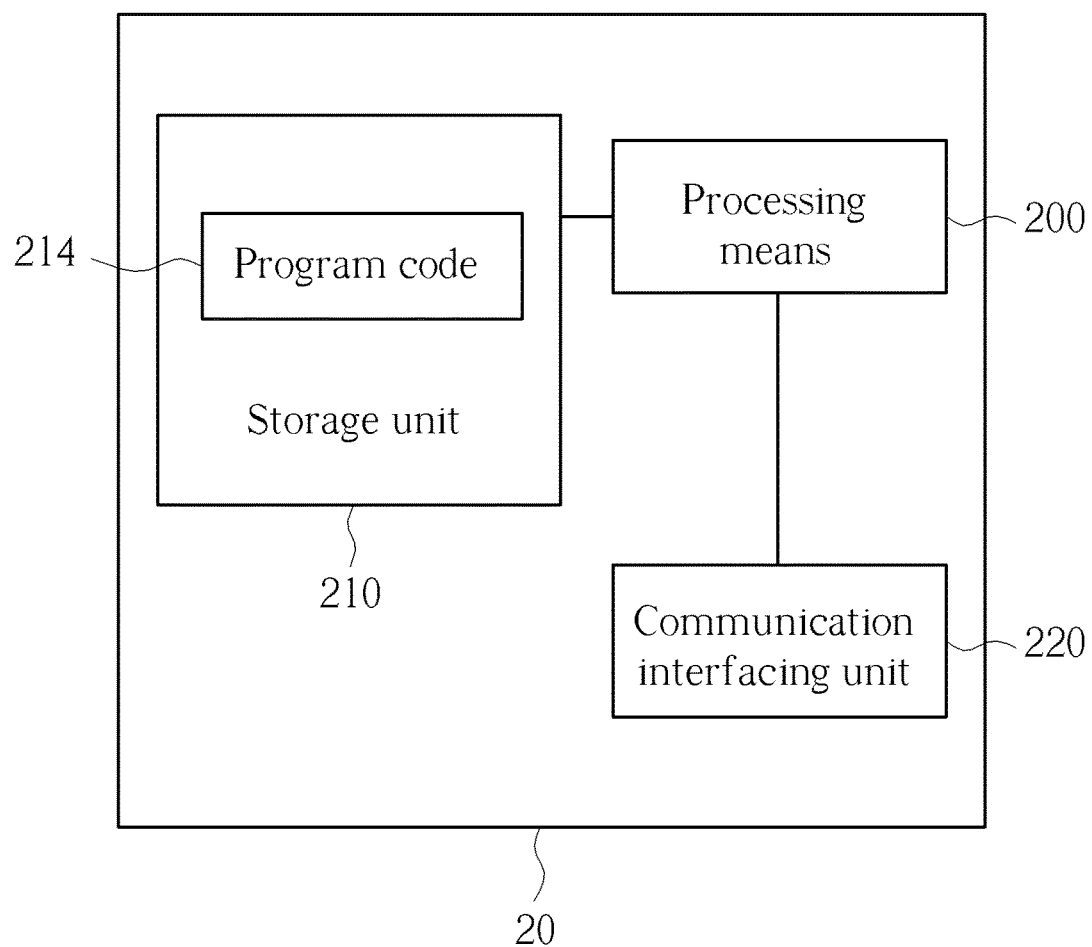
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage unit, non-transitory computer-readable medium (e.g., tangible media), etc. The communication interfacing unit 220 is preferably a transceiver and is used to transmit and receive signals (e.g., data, messages and/or packets) according to processing results of the processing means 200.

Figure 3:
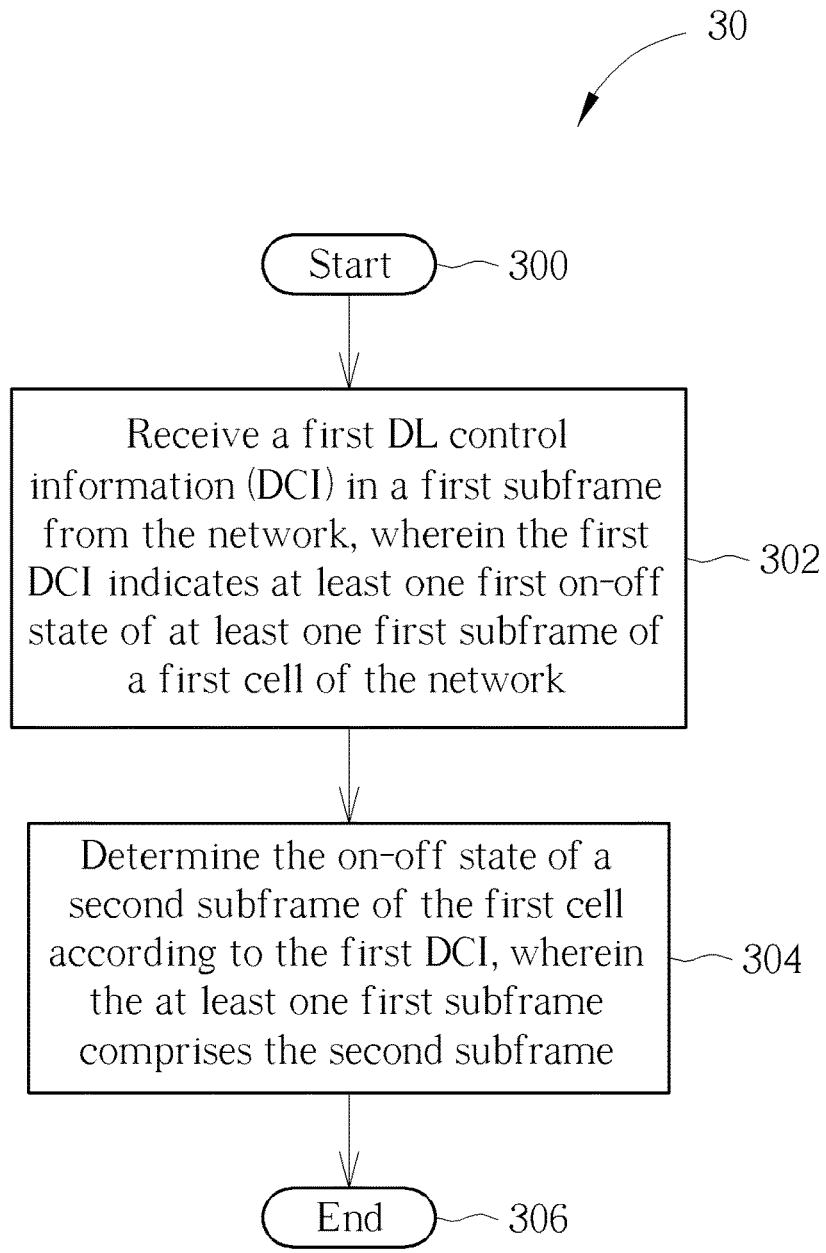
FIG. 3 is a flowchart of a process according to an example of the present invention.

FIG. 3 is a flowchart of a process 30 according to an example of the present invention. The process 30 may be utilized in a communication device shown in FIG. 1, to handling an on-off state of a cell of the network. The process 30 may be compiled into the program code 214 and includes the following steps:

Step 300: Start.

Step 302: Receive a first DL control information (DCI) in a first subframe from the network, wherein the first DCI indicates at least one first on-off state of at least one first subframe of a first cell of the network.

Step 304: Determine the on-off state of a second subframe of the first cell according to the first DCI, wherein the at least one first subframe comprises the second subframe.

Step 306: End.

According to the process 30, the communication device receives a first DCI in a first subframe from the network, wherein the first DCI indicates at least one first on-off state of at least one first subframe of a first cell of the network. Then, the communication device determines the on-off state of a second subframe of the first cell according to the first DCI, wherein the at least one first subframe may include the second subframe. That is, the at least one first on-off state indicated by the DCI may be used for determining the on-off state of the second subframe, if the second subframe is included in the at least one first subframe. An on-off state of a cell can be indicated to a communication device timely according to the process 30, because DCI is transmitted frequently with a short period via a physical layer. Thus, the on-off state of the cell can be switched with a short transition time and low overhead. As a result, throughput of the communication device can be improved according to the efficient switching of the on-off state of the cell.

Realization of the process 30 is not limited to the above description.

According to the process 30, the communication device may further receive a second DCI in a third subframe after the first subframe from the network, wherein the second DCI indicates at least one second on-off state of at least one second subframe of the first cell. Then, the communication device may determine the on-off state of the second subframe of the first cell according to the first DCI and the second DCI, wherein the at least one second subframe may include the second subframe. That is, the on-off state of the second subframe is determined according to both the first DCI and the second DCI, and the accuracy of the determination of the on-off state is thus improved. In one example, the method can be further extended to the case of multiple DCIs, where more DCIs are used for determining an on-off state of a subframe. In this situation, a decision rule (e.g., majority rule) may be used for processing the DCIs. For example, the on-off state may be determined according to the DCIs and the majority rule. The majority rule makes a decision based on which choice dominates. For example, the communication device chooses that the network intends to transmit a bit "1", if the number of received bits "1" is greater than the number of received bits "0".

Figure 4:
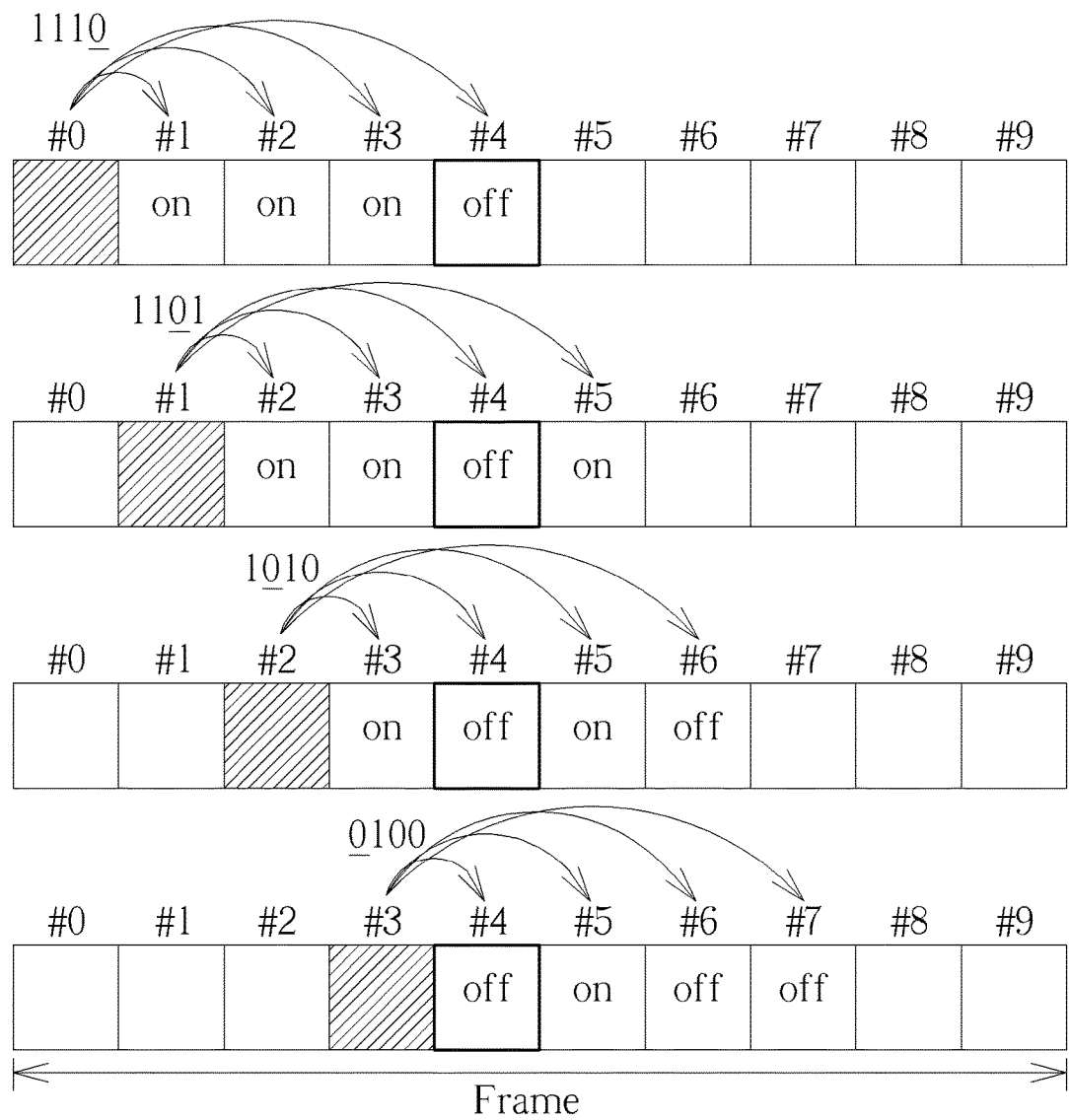
FIG. 4 is a schematic diagram of DCIs for an on-off state of a subframe according to an example of the present invention.

FIG. 4 is a schematic diagram of DCIs for an on-off state of a subframe according to an example of the present invention. In FIG. 4, an on-off state of the subframe 4 is to be determined by the communication device. In detail, the communication device receives a first DCI in the subframe 0, and the first DCI indicates on-off states of the subframes 1-4 (the at least one first subframe in the process 30) which are "on", "on", "on", "off", respectively. As shown in FIG. 4, bits of "1110" in the first DCI are used for indicating the on-off states of the subframes 1-4. Similarly, the communication device receives a second DCI in the subframe 1, and the second DCI indicates on-off states of the subframes 2-5 (the at least one second subframe stated previously) which are "on", "on", "off", "on", respectively. Bits of "1101" in the second DCI are used for indicating the on-off states of the subframes 2-5. The communication device receives a third DCI in the subframe 2, and the third DCI indicates on-off states of the subframes 3-6 which are "on", "off", "on", "off", respectively. Bits of "1010" in the third DCI are used for indicating the on-off states of the subframes 3-6. The communication device receives a fourth DCI in the subframe 3, and the fourth DCI indicates on-off states of the subframes 4-7 which are "off", "on", "off", "off", respectively. Bits of "0100" in the fourth DCI are used for indicating the on-off states of the subframes 4-7.

Thus, the communication device may determine that the on-off state of the subframe 4 (the second subframe in the process 30) is "off", because all of the DCIs indicate that the on-off state of the subframe 4 is "off". In certain situations, a DCI may not be received correctly, e.g., due to stability of a wireless link. For example, the third DCI in FIG. 4 may indicate that the on-off state of the subframe 4 is "on" due to an erroneous reception, e.g., bits of "1110" in the third DCI may be received in the subframe 2. However, the communication device may still determines that the on-off state of the subframe 4 is "off" correctly according to the majority rule, if the other 3 DCIs indicate that the on-off state is "off".

In one example, the on-off state of the second subframe of the first cell in the process 30 may be determined according to the second DCI, if a consistent on-off state is not obtained according to the first DCI, the second DCI and the majority rule are different. That is, the latest DCI(s) may be used for determining the on-off state, if the majority rule cannot be performed properly.

Figure 5:
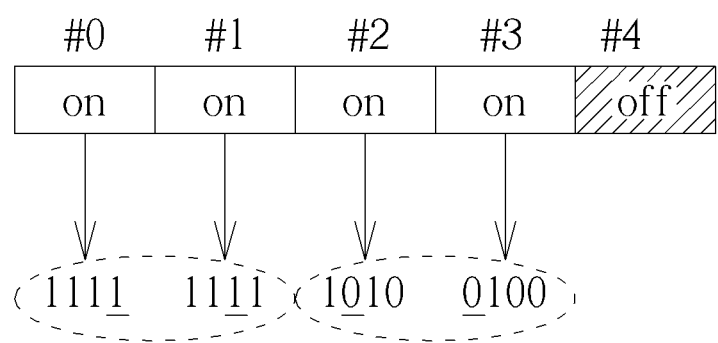
FIG. 5 is a schematic diagram of DCIs for an on-off state of a subframe according to an example of the present invention.

FIG. 5 is a schematic diagram of DCIs for an on-off state of a subframe according to an example of the present invention. In FIG. 5, an on-off state of the subframe 4 is to be determined by the communication device. Detail of FIG. 5 can be referred to the description of FIG. 4, and is not narrated herein. The communication device receives 4 DCIs in the subframes 0-3. As shown in FIG. 5, bits received in the DCIs are "1111", "1111", "1010" and "0100", respectively. That is, an on-off state of the subframe 4 is indicated by the fourth bit in the bits "1111", the third bit in the bits "1111", the second bit in the bits "1010" and the first bit in the bits "0100". In other words, the bits "1", "1", "0" and "0" in the DCIs are used to indicate the on-off state of the subframe 4. The majority rule cannot be performed properly, because the number of the bit "1" and the number of the bit "0" are the same. In this situation, the communication device may determine the on-off state of the subframe 4 according to the DCIs received in the nearest subframes (e.g., the subframes 2-3). Thus, the communication device may determine that the on-off state of the subframe 4 is "off", because the latest two DCIs indicate that the on-off state of the subframe 4 is "off".

In one example, in the process 30, the communication device may perform a blind decoding on a DL control channel of the second subframe of the first cell, if the on-off state of the second subframe of the first cell is not indicated by any DCI in a previous subframe. Then, the communication device may determine the on-off state of the second subframe of the first cell according to a decoding result of the blind decoding. That is, the communication device may not be able to receive any DCI indicating the on-off state of the second subframe. The communication device may perform the blind decoding to obtain the on-off state. The DL control channel may include a physical DL control channel (PDCCH) and/or an enhanced PDCCH (ePDCCH), and is not limited herein.

In one example, the at least one first subframe in the process 30 may be after the first subframe. That is, on-off state(s) of the subframe(s) may be indicated by using one or more previous subframes. In one example, the first DCI may be received in the first subframe of the first cell. That is, the on-off state of the first cell may be indicated by the first DCI from the same cell, i.e., the first cell may be self-scheduled. In one example, the first DCI may be received in the first subframe of a second cell. That is, the on-off state of the first cell may be indicated by the first DCI transmitted via a different cell, i.e., the first cell may be cross-carrier scheduled. Taking FIG. 4 as an example, the DCIs may be transmitted via the second cell, while the on-off states of the subframes of the first cell are indicated. The first cell may be a secondary cell, and the second cell may be a primary cell. In one example, the first cell may be a primary cell, and the second cell may be a secondary cell. In one example, the first cell and the second cell may both be primary cells. In one example, the first cell and the second cell may both be secondary cells. In addition, the first cell may be operated in a licensed band, and the second cell may be operated in an unlicensed band. In one example, the first cell may be operated in an unlicensed band, and the second cell may be operated in a licensed band. In one example, the first cell and the second cell may both be operated in a licensed band. In one example, the first cell and the second cell may both be operated in an unlicensed band.

Figure 6:
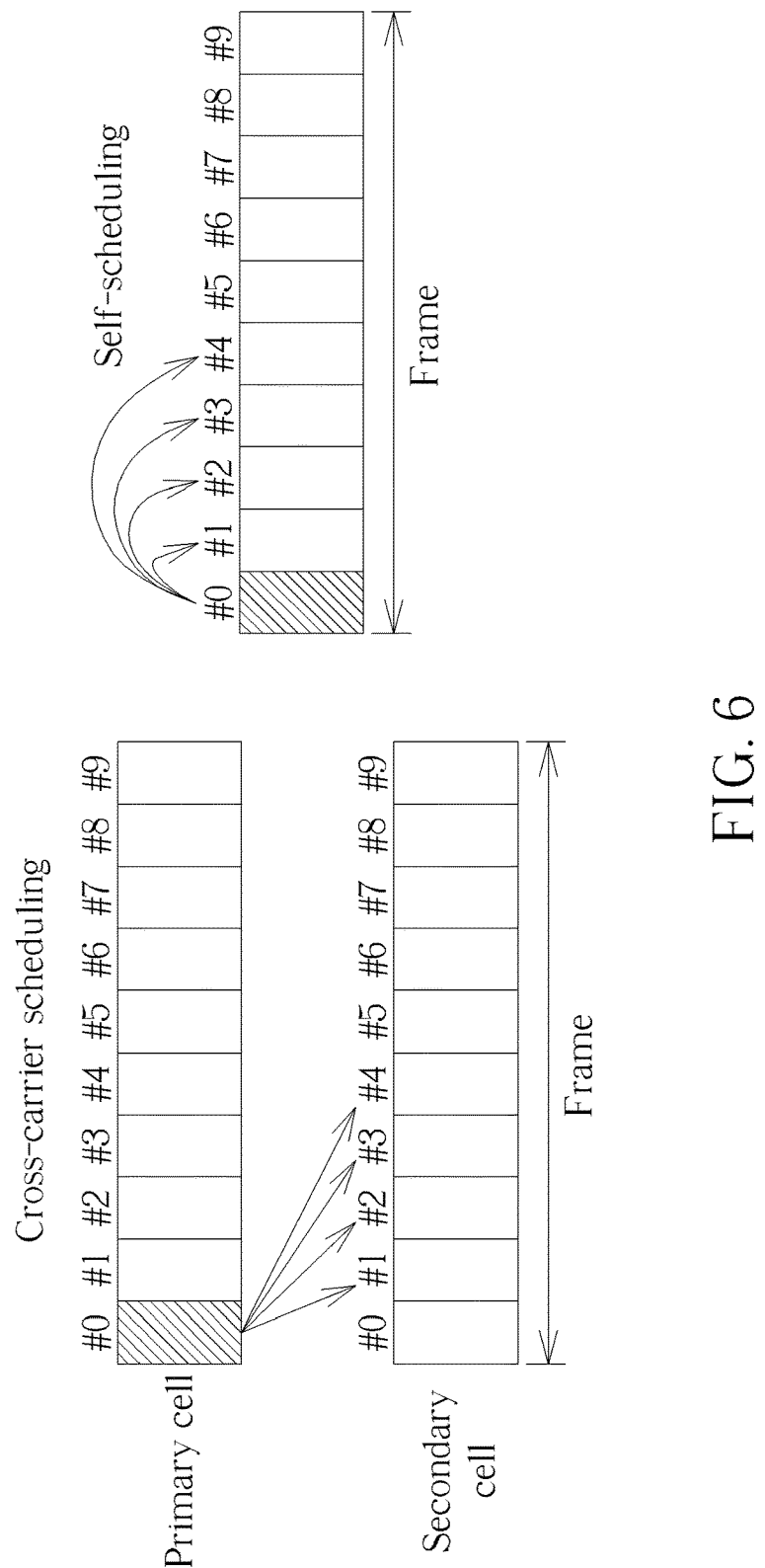
FIG. 6 is a schematic diagram of DCIs for an on-off state of a subframe according to an example of the present invention.

FIG. 6 is a schematic diagram of DCIs for an on-off state of a subframe according to an example of the present invention. The left-hand side of FIG. 6 is an example of cross-scheduling. The communication device receives a DCI in the subframe 0 of a primary cell (i.e., scheduling cell), and the DCI indicates on-off states of the subframes 1-4 of a secondary cell (i.e., scheduled cell). The right-hand side of FIG. 6 is an example of self-scheduling. The communication device receives a DCI in the subframe 0 of a cell, and the first DCI indicates on-off states of the subframes 1-4 of the same cell.

In one example, the first DCI in the process 30 may be configured with a newly defined DCI format. That is, the format of the first DCI is not limited to a legacy format defined in the 3GPP standard. In another example, the at least one first on-off state of the at least one first subframe of the first cell may be indicated by a new field of the first DCI. That is, the first DCI may be configured with a legacy DCI format with the new field.

In one example, the at least one first on-off state in the process 30 may be indicated by a plurality of bits for the at least one first on-off state and a time delay for indicating a distance between the first subframe and an initial subframe of the at least one first subframe. Taking the first row of FIG. 4 as an example, the bits are "1110" for the first DCI, and the time delay is 1. For the second row of FIG. 4, the bits are "1101" for the first DCI, and the time delay is 1. Note that the bits and the time delay are simply an example for representing the subframes and the on-off states of the subframes. Other representations may also be used for realizing the present invention, and is not limited herein.

In one example, the second subframe in the process 30 is in a plurality of subframes which is predetermined or is configured by the network. The plurality of subframes may be all subframes in a frame. That is, the communication device may need to receive (e.g., detect) a DCI in each of the subframes. In another example, the communication device may need to receive (e.g., detect) a DCI in each of a subset of all the subframes.

Figure 7:
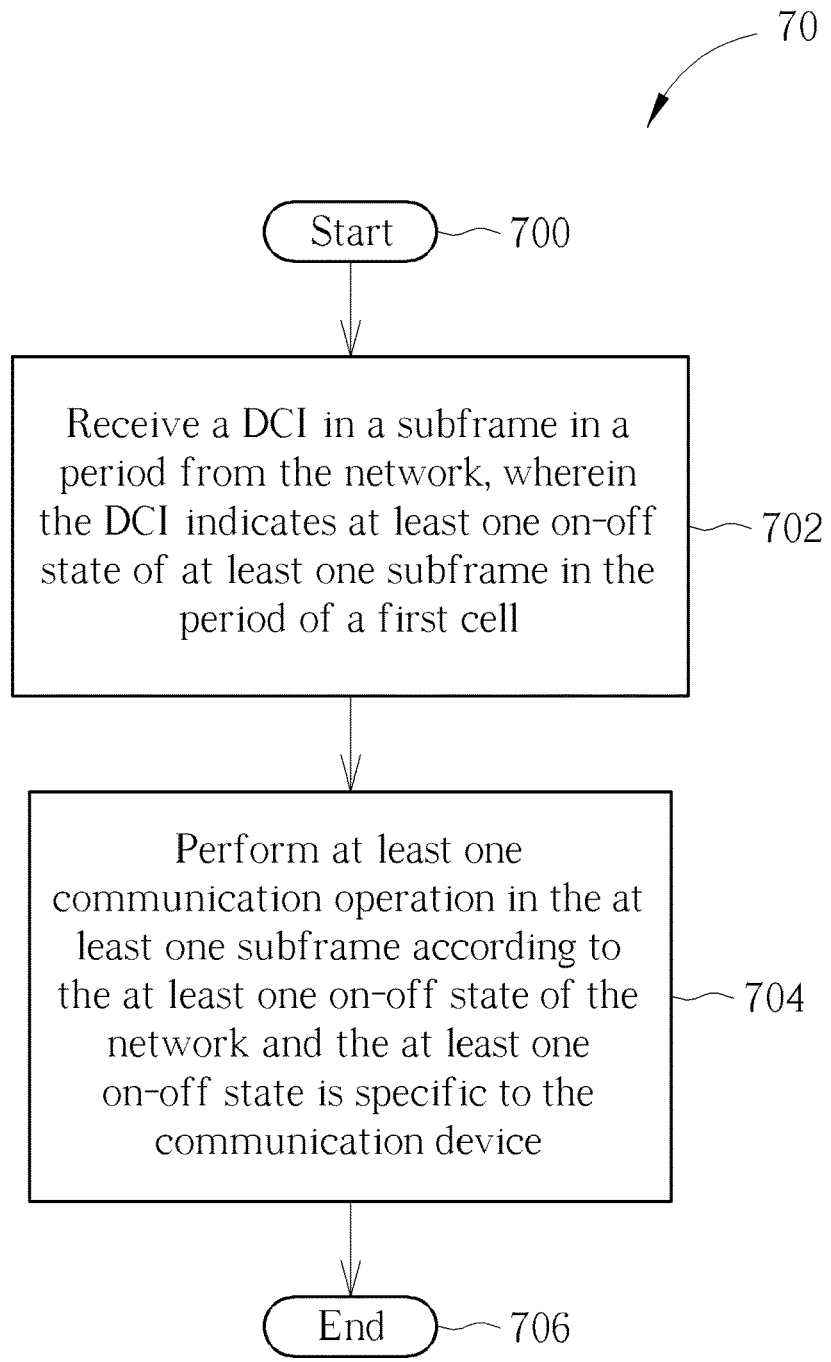
FIG. 7 is a flowchart of a process according to an example of the present invention.

FIG. 7 is a flowchart of a process 70 according to an example of the present invention. The process 70 may be utilized in a communication device shown in FIG. 1, to handling an on-off state of a cell of the network. The process 70 may be compiled into the program code 214 and includes the following steps:

Step 700: Start.

Step 702: Receive a DCI in a subframe in a period from the network, wherein the DCI indicates at least one on-off state of at least one subframe in the period of a first cell of the network and the at least one on-off state is specific to the communication device.

Step 704: Perform at least one communication operation in the at least one subframe according to the at least one on-off state of the network.

Step 706: End.

According to the process 70, the communication device receives a DCI in a subframe in a period from the network, wherein the DCI may indicate at least one on-off state of at least one subframe in the period of a first cell of the network and the at least one on-off state is specific to the communication device. Then, the communication device performs at least one communication operation in the at least one subframe according to the at least one on-off state of the network. That is, the at least one on-off state may not be real on-off state(s) of the first cell, but is specific for the communication device to perform the at least one communication operation in the at least one subframe. For example, an on-off state of a subframe of the first cell may be anon state (or an off state) specific for the communication device, when the first cell is actually in the on state. In another example, the on-off state of the subframe of the first cell may be the off state specific for the communication device, when the first cell is actually in the off state.

In other words, the communication device only needs to perform a DCI detection (e.g., blind decoding) for receiving the DCI in the subframe, and stops performing at least one DCI detection for at least one DCI in the at least one subframe. Thus, the at least one-off state can be seen as data scheduling for the at least one subframe. An on state of a subframe means that the subframe is scheduled for a communication operation, and an off state of a subframe means that the subframe is not scheduled for a communication operation. As a result, power consumption of the communication device is reduced because unnecessary DCI detections are avoided.

Furthermore, an on-off state of a cell can be indicated to a communication device timely according to the process 70, because DCI is transmitted frequently with a short period via a physical layer. Thus, the on-off state of the cell can be switched with a short transition time and low overhead. As a result, throughput of the communication device can be improved according to the efficient switching of the on-off state of the cell.

Realization of the process 70 is not limited to the above description.

In one example, the communication device may determine that the at least one on-off state of the at least one subframe is an off state, if the DCI is not received in the subframe. That is, the communication device determines that all subframes in the period are in the off state, if the DCI in the subframe is not detected. In one example, the communication device may receive the DCI by performing DCI detection (e.g., blind decoding) in the subframe.

In one example, a communication of the at least one communication operation may include a transmission or a reception. That is, the at least one communication operation may include transmission(s), reception(s), or combination of transmission(s) and reception(s). In one example, the at least one subframe in the process 70 may be after the subframe. That is, on-off state(s) of the subframe(s) may be indicated by using a previous subframe. In one example, the DCI may be received in the subframe of the first cell. That is, the at least one on-off state of the first cell may be indicated by the DCI from the same cell, i.e., the first cell may be self-scheduled. In one example, the DCI may be received in the subframe of a second cell. That is, the at least one on-off state of the first cell may be indicated by the DCI transmitted via a different cell, i.e., the first cell may be cross-carrier scheduled. The first cell may be a secondary cell, and the second cell may be a primary cell. In one example, the first cell may be a primary cell, and the second cell may be a secondary cell. In one example, the first cell and the second cell may both be primary cells. In one example, the first cell and the second cell may both be secondary cells. In addition, the first cell may be operated in a licensed band, and the second cell may be operated in an unlicensed band. In one example, the first cell may be operated in an unlicensed band, and the second cell may be operated in a licensed band. In one example, the first cell and the second cell may both be operated in a licensed band. In one example, the first cell and the second cell may both be operated in an unlicensed band.

In one example, the DCI in the process 70 may be configured with a newly defined DCI format. That is, the format of the DCI is not limited to a legacy format defined in the 3GPP standard. In another example, the at least one on-off state of the at least one subframe of the first cell may be indicated by a new field of the DCI. That is, the DCI may be configured with a legacy DCI format with the new field.

Figure 8:
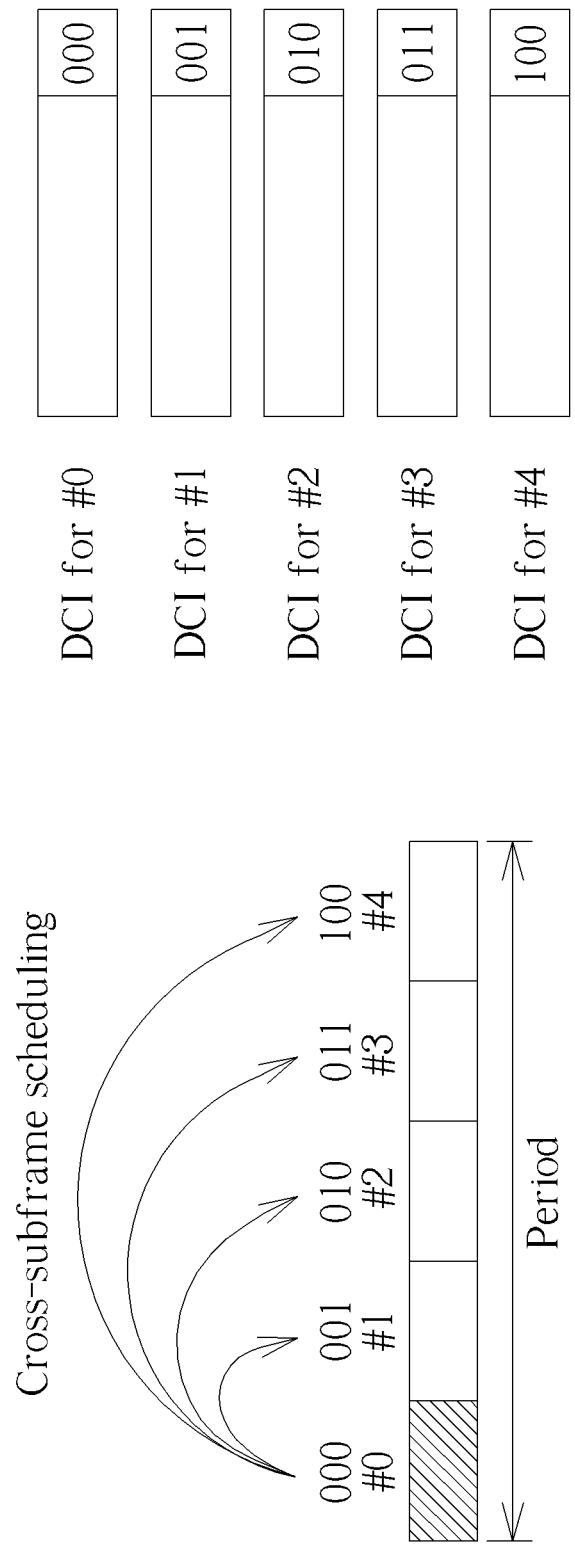
FIG. 8 is a schematic diagram of a DCI for on-off states of subframes according to an example of the present invention.

FIG. 8 is a schematic diagram of a DCI for on-off states of subframes according to an example of the present invention. In FIG. 8, 3 bits in a DCI are used for indicating the on-off states of subframes 0-4, and each 3 bits indicate an on-off state of a corresponding subframe. For example, the communication device may determine that the on-off state of the subframe 2 is an on state, if the bits "010" are included in the DCI. According to the present invention, the communication device performs a DCI detection in the subframe 0, and does not need to perform DCI detections in the subframes 1-4. In addition, the communication device determines the subframes 1-4 are in an off state, if the DCI is not received in the subframe 0. Thus, cross-subframe scheduling can be realized according to the present invention, while power consumption is reduced by avoiding unnecessary DCI detections.

In one example, the period in the process 70 may be a predetermined value or may be dynamically configured by the network. The period may be a frame (e.g., consist of 10 subframes) or half of the frame (e.g., consist of 5 subframes), and is not limited.

Figure 9:
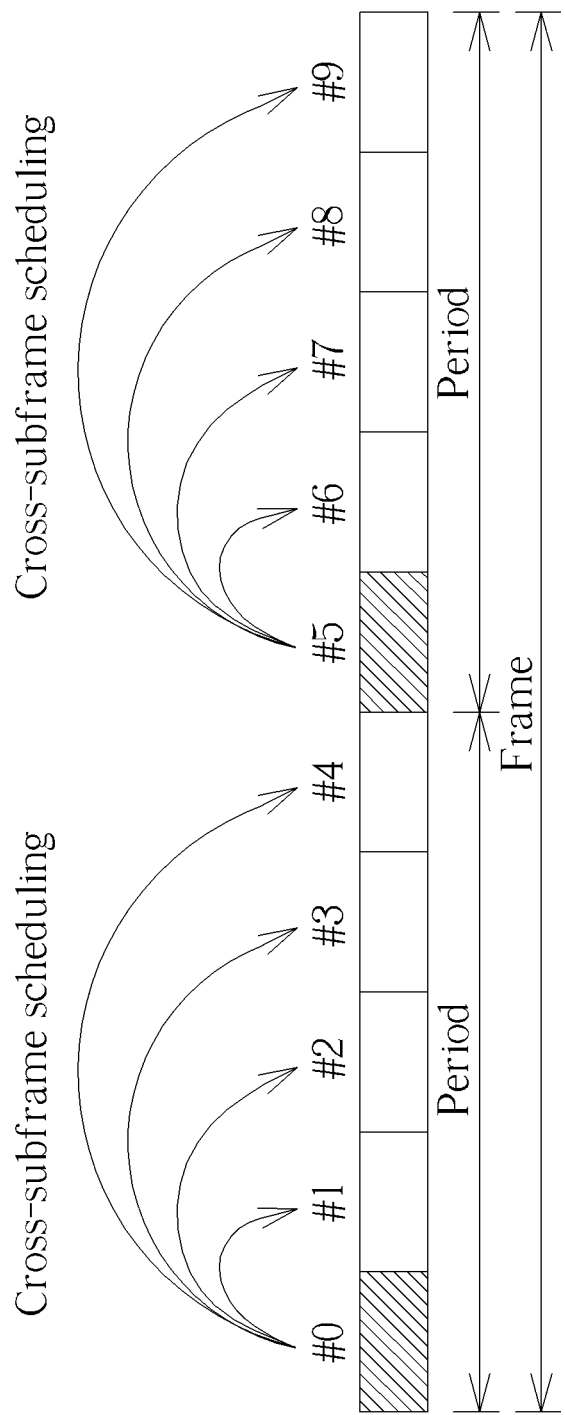
FIG. 9 is a schematic diagram of DCIs for on-off states of subframes according to an example of the present invention.

FIG. 9 is a schematic diagram of DCIs for on-off states of subframes according to an example of the present invention. In FIG. 9, the period is 5 subframes, and the on-off states of 5 subframes are indicated periodically according to the period. The DCI in the subframe 0 may indicate on-off states of the subframes 1-4 and the DCI in the subframe 5 may indicate on-off states of the subframes 6-9. When combining with the example in FIG. 8, 3 bits in the DCI can be used for indicating an on-off state of a corresponding subframe. According to the present invention, the communication device performs DCI detections in the subframes 0 and 5, and does not need to perform DCI detections in the subframes 1-4 and 6-9. Thus, cross-subframe scheduled can be realized according to the present invention, while power consumption is reduced by avoiding unnecessary DCI detections.

Figure 10:
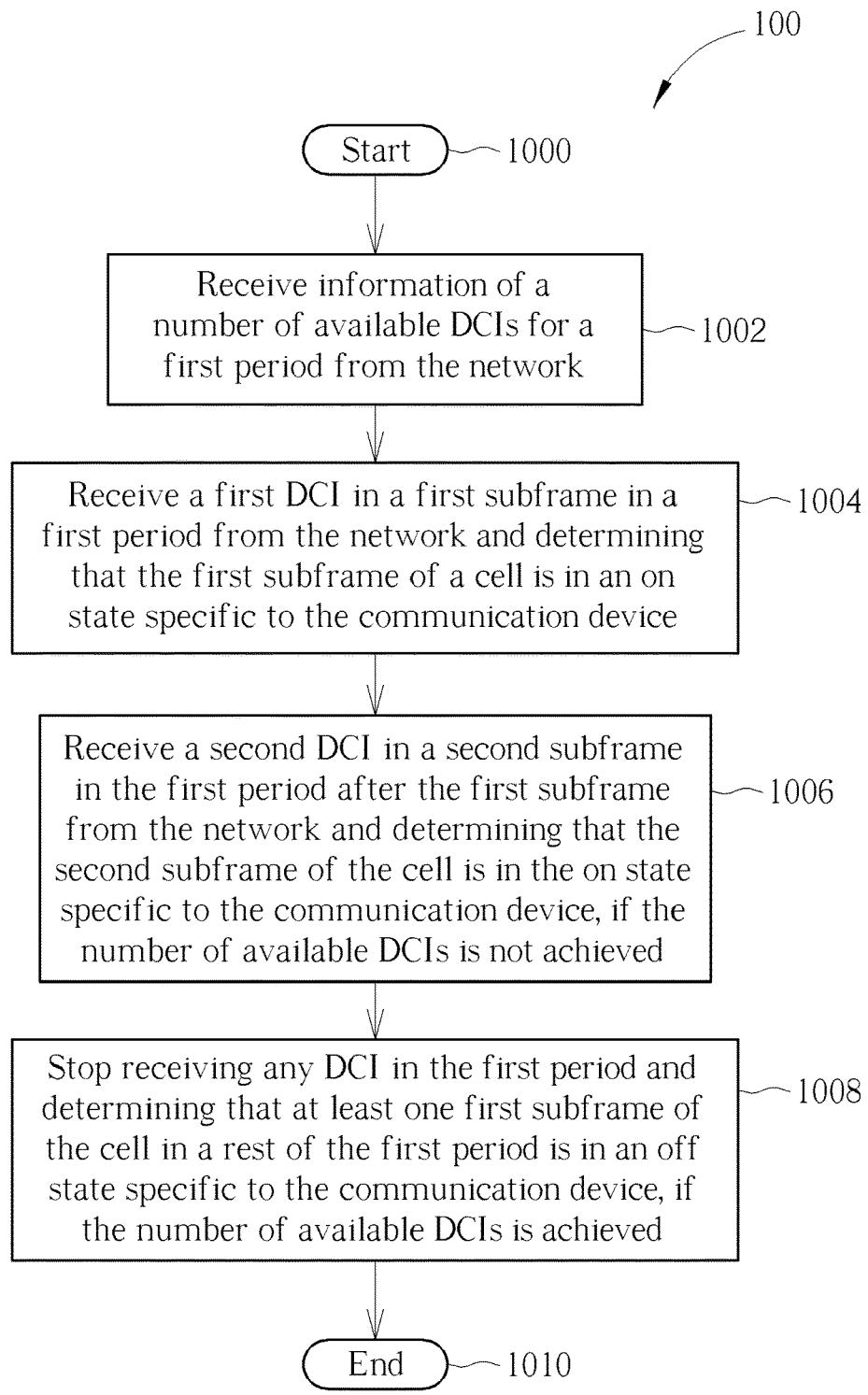
FIG. 10 is a flowchart of a process according to an example of the present invention.

FIG. 10 is a flowchart of a process 100 according to an example of the present invention. The process 100 may be utilized in a communication device shown in FIG. 1, to handling an on-off state of a cell of the network. The process 100 may be compiled into the program code 214 and includes the following steps:

Step 1000: Start.

Step 1002: Receive information of a number of available DCIs for a first period from the network.

Step 1004: Receive a first DCI in a first subframe in a first period from the network and determining that the first subframe of a cell is in an on state specific to the communication device.

Step 1006: Receive a second DCI in a second subframe in the first period after the first subframe from the network and determining that the second subframe of the cell is in the on state specific to the communication device, if the number of available DCIs is not achieved.

Step 1008: Stop receiving any DCI in the first period and determining that at least one first subframe of the cell in a rest of the first period is in an off state specific to the communication device, if the number of available DCIs is achieved.

Step 1010: End.

According to the process 100, the communication device receives (e.g., detects) information of a number of available DCIs for a first period from the network. The communication device may receive a first DCI (if available) in a first subframe in a first period from the network, and may determine that the first subframe of a cell is in an on state specific to the communication device. Then, the communication device may receive a second DCI in a second subframe in the first period after the first subframe from the network and determining that the second subframe of the cell is in the on state specific to the communication device, if the number of available DCIs is not achieved. The communication device may stop receiving any DCI in the first period and determining that at least one first subframe of the cell in a rest of the first period is in an off state specific to the communication device, if the number of available DCIs is achieved. In other words, the communication device receives one or more DCIs in the first period according to the number of available DCIs for the first period. The communication device continues to receive (e.g., detect) the DCIs in the first period, if the number of received DCIs is smaller than the number of available DCIs. The communication device stops receiving the DCIs in the first period, if the number of received DCIs achieves the number of available DCIs. Further, the rest of the subframe(s) in the first period which are not processed are determined to be in the off state.

An on-off state of a cell can be indicated to a communication device timely according to the process 100, because DCI is transmitted frequently with a short period via a physical layer. The on-off state of the cell can also be determined by the communication device efficiently. Thus, the on-off state of the cell can be switched with a short transition time and low overhead. As a result, throughput of the communication device can be improved, and power consumption of the communication device can be reduced.

Realization of the process 100 is not limited to the above description.

In one example, the communication device may determine that on-off states of all subframes are an off state, if the information of the number of available DCIs is not received in the first subframe. That is, the communication device determines that all subframes in the first period are in the off state, if the number of available DCIs for the first period is not received.

In one example, the first subframe and the second subframe may be consecutive subframes. That is, the DCIs are received sequentially in the subframes without skipping a certain subframe. In addition, the communication device may determine at least one second subframe within the first subframe and a third subframe in the first period is in the on state specific to the communication device, when the number of available DCIs is achieved in the third subframe. That is, all subframe(s) within the first subframe (where the first DCI is detected) and the last subframe (where the last DCI is detected), including the first subframe and the last subframe, are determined to be in the on state specific to the communication device.

In one example, the communication device may receive a third DCI in a fourth subframe in a second period from the network, and may determine that the fourth subframe of the cell is in the on state specific to the communication device. That is, the communication device may repeat the process 100 to receive DCIs in one or more periods, to obtain on-off states of subframes of a cell in the periods, wherein the on-off states are specific to the communication device. Detail of the operation of the communication device for each of the periods can be referred to the previous description, and is not narrated herein.

In one example, the cell in the process 100 may be a primary cell, or the cell may be a secondary cell. The cell may be operated in a licensed band, or may be operated in an unlicensed band.

Figure 11:
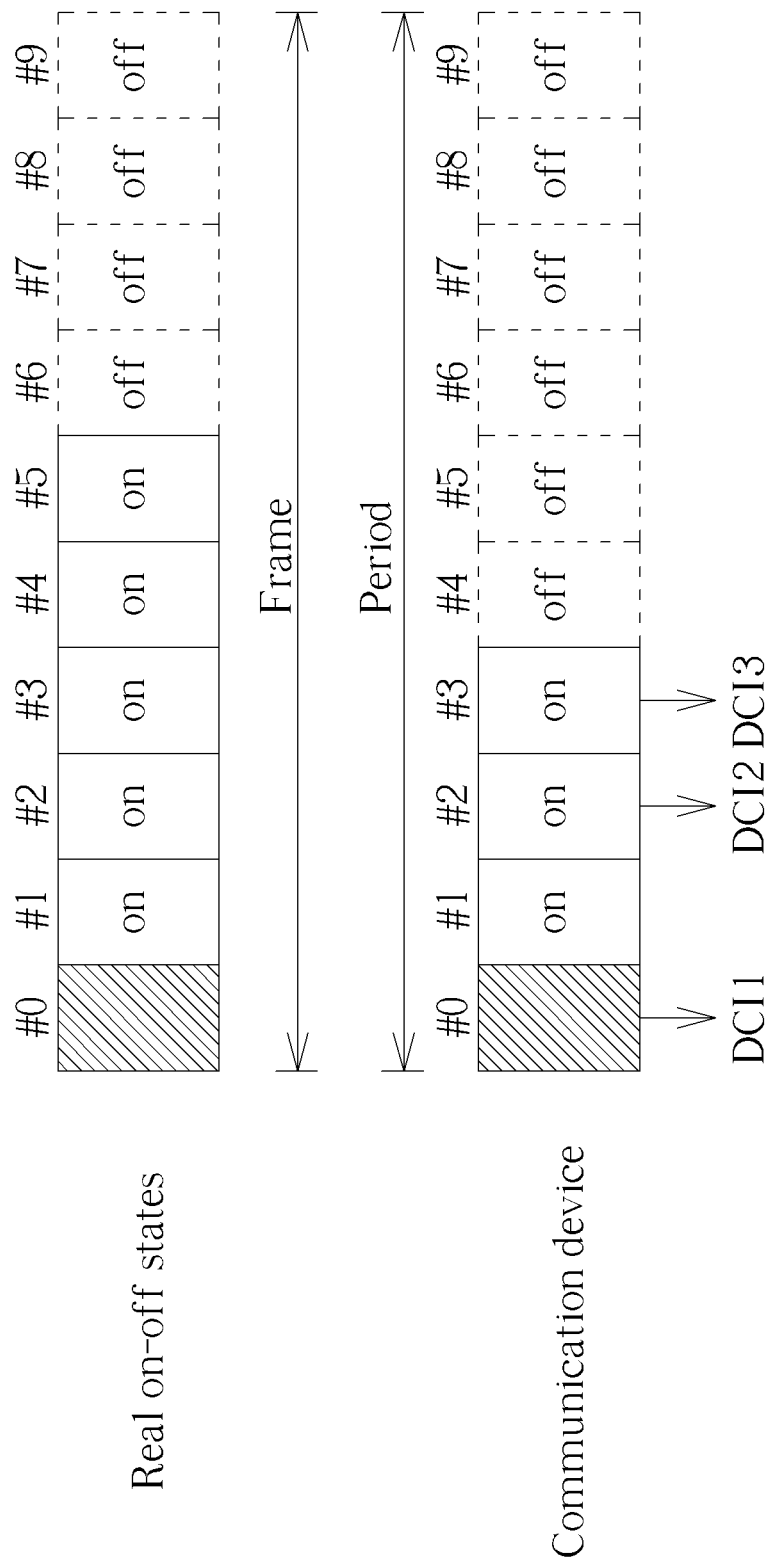
FIG. 11 is a schematic diagram of DCIs for on-off states of subframes according to an example of the present invention.

FIG. 11 is a schematic diagram of DCIs for on-off states of subframes according to an example of the present invention. Real on-off states operated by a cell are shown at the top, and on-off states operated by (i.e., specific to) a communication device are shown at the bottom. A period for receiving DCIs is a frame (i.e., 10 subframes), and the communication device receives information of the number of available DCIs which is 3 for the period. Starting from the subframe 0, the communication device tries to detect a DCI in each of the subframes sequentially until 3 DCIs are received, and determines that the subframes that have been gone through are in the on state. In the present example, the communication device receives DCIs DCI1-DCI3 in the subframes 0, 2 and 3, respectively. The communication device stops detecting any DCI after the DCI DCI3 in the subframe 3 is obtained, because all the available DCIs are received. Accordingly, the communication device determines that the subframes 0-3 are in the on state, and subframes (i.e., the subframes 4-9) after the subframe 3 are in an off state. In addition, the communication device determines the subframes 1-9 are in the off state, if information of the number of available DCIs is not received in the subframe 0. Thus, the communication device may perform communication operations in the subframes 0-3, and reduces power consumption (e.g., turns off) in the subframes 4-9.

Figure 12:
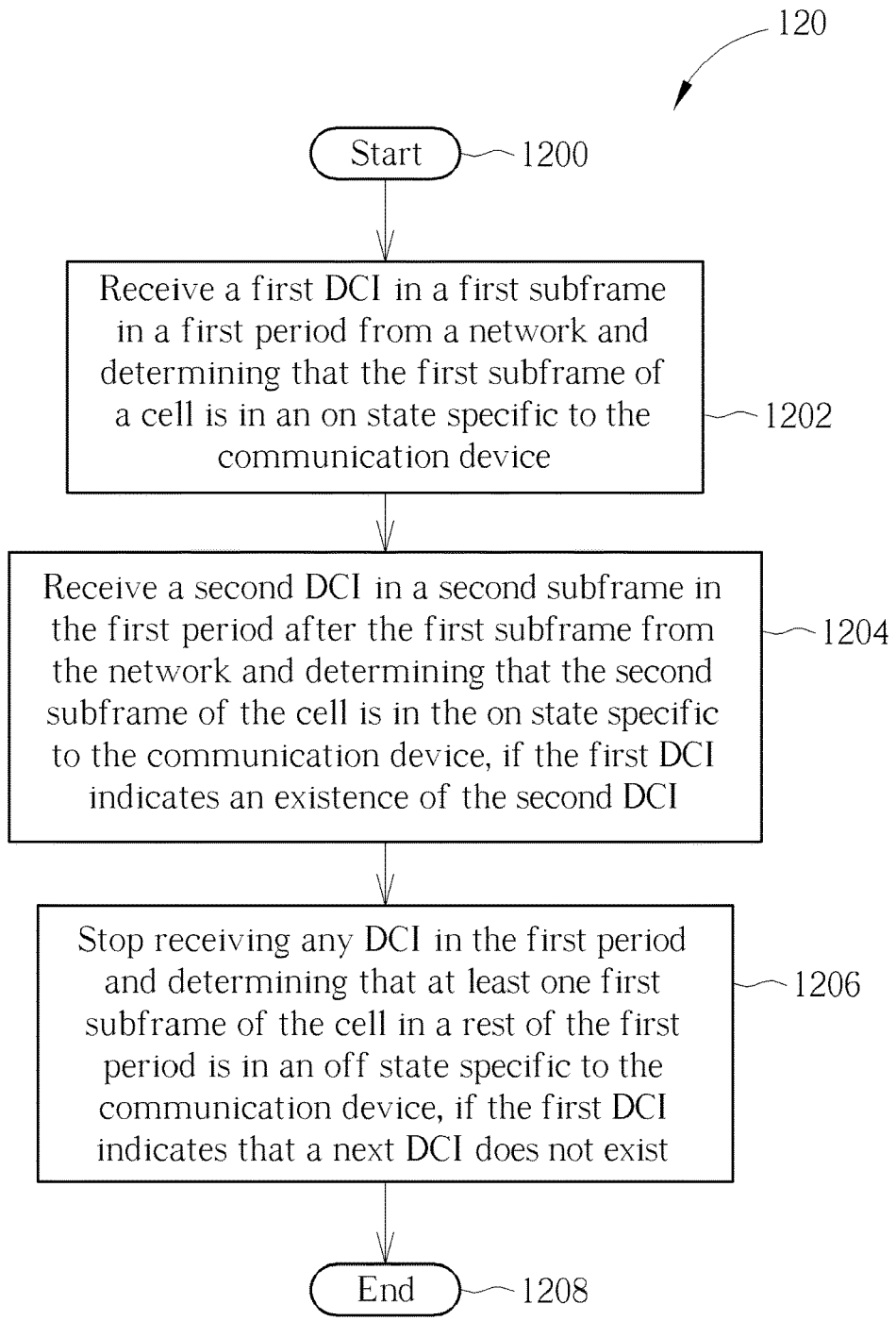
FIG. 12 is a flowchart of a process according to an example of the present invention.

FIG. 12 is a flowchart of a process 120 according to an example of the present invention. The process 120 may be utilized in a communication device shown in FIG. 1, to handling an on-off state of a cell of the network. The process 120 may be compiled into the program code 214 and includes the following steps:

Step 1200: Start.

Step 1202: Receive a first DCI in a first subframe in a first period from a network and determining that the first subframe of a cell is in an on state specific to the communication device.

Step 1204: Receive a second DCI in a second subframe in the first period after the first subframe from the network and determining that the second subframe of the cell is in the on state specific to the communication device, if the first DCI indicates an existence of the second DCI.

Step 1206: Stop receiving any DCI in the first period and determining that at least one first subframe of the cell in a rest of the first period is in an off state specific to the communication device, if the first DCI indicates that a next DCI does not exist.

Step 1208: End.

According to the process 120, the communication device may receive a first DCI in a first subframe in a first period from a network and determining that the first subframe of a cell is in an on state specific to the communication device. Then, the communication device may receive a second DCI in a second subframe in the first period after the first subframe from the network and determining that the second subframe of the cell is in the on state specific to the communication device, if the first DCI indicates an existence of the second DCI. The communication device may stop receiving any DCI in the first period and determining that at least one first subframe of the cell in a rest of the first period is in an off state specific to the communication device, if the first DCI indicates that a next DCI does not exist. In other words, the communication device continues to receive (e.g., detect) the DCIs in the first period, if a next DCI is indicated available. The communication device stops receiving the DCIs in the first period, if a next DCI is indicated not available. Further, the rest of the subframe(s) in the first period which are not processed are determined to be in the off state.

An on-off state of a cell can be indicated to a communication device timely according to the process 120, because DCI is transmitted frequently with a short period via a physical layer. The on-off state of the cell can also be determined by the communication device efficiently. Thus, the on-off state of the cell can be switched with a short transition time and low overhead. As a result, throughput of the communication device can be improved, and power consumption of the communication device can be reduced.

Realization of the process 120 is not limited to the above description.

In one example, the first subframe and the second subframe may be consecutive subframes. That is, the DCIs are received sequentially in the subframes without skipping a certain subframe. In addition, the communication device may determine at least one second subframe within the first subframe and a third subframe in the first period is in the on state specific to the communication device, when a third DCI in the third subframe indicates that a next DCI does not exist. That is, all subframe(s) within the first subframe (where the first DCI is detected) and the last subframe (where the last DCI is detected), including the first subframe and the last subframe, are determined to be in the on state specific to the communication device.

In one example, the communication device may receive a fourth DCI in a fourth subframe in a second period from the network, and may determine that the fourth subframe of the cell is in the on state specific to the communication device. That is, the communication device may repeat the process 120 to receive DCIs in one or more periods, to obtain on-off states of subframes of a cell in the periods, wherein the on-off states are specific to the communication device. Detail of the operation of the communication device for each of the periods can be referred to the previous description, and is not narrated herein.

In one example, the cell in the process 120 may be a primary cell, or the cell may be a secondary cell. The cell may be operated in a licensed band, or may be operated in an unlicensed band.

Figure 13:
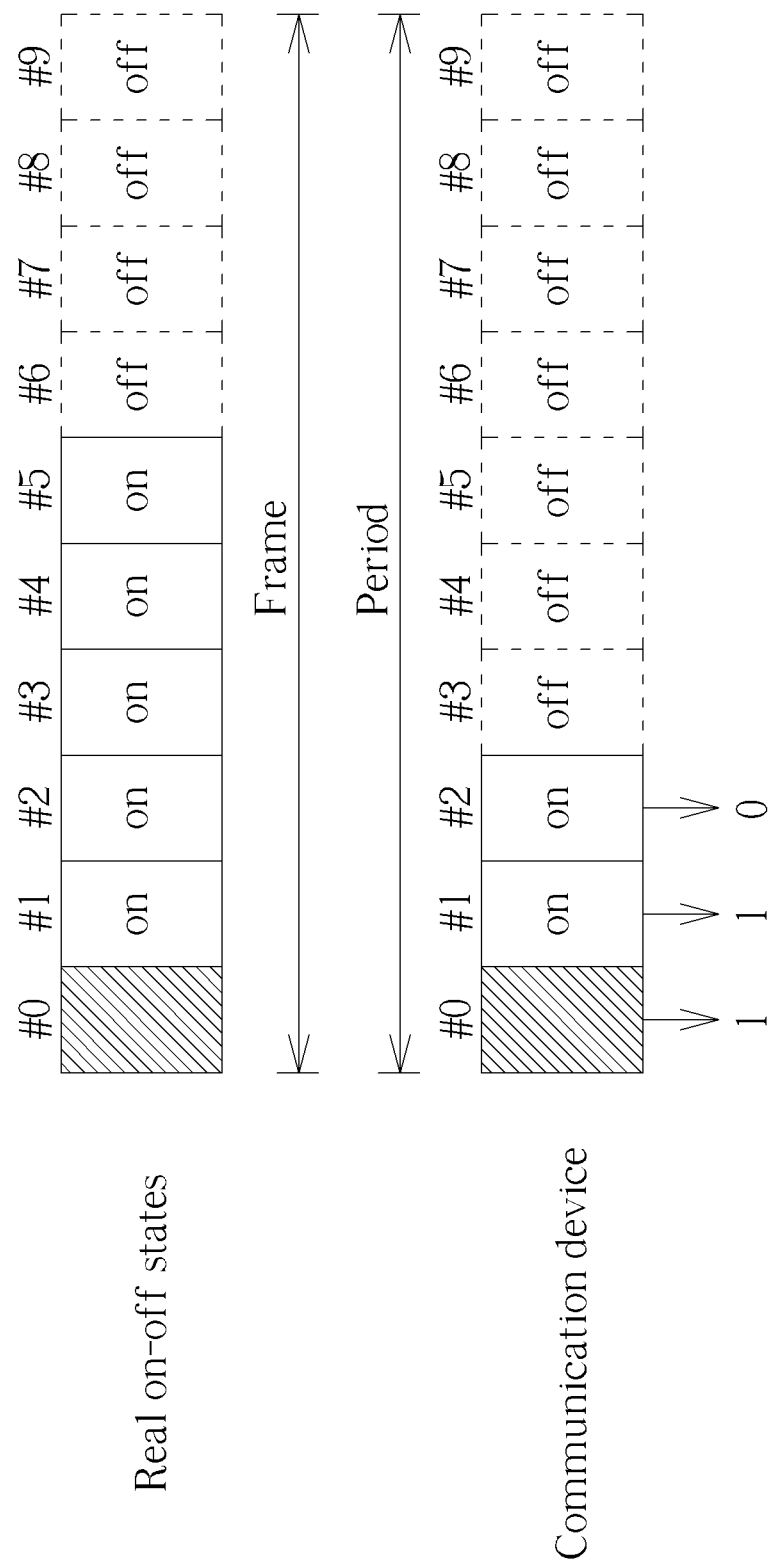
FIG. 13 is a schematic diagram of DCIs for on-off states of subframes according to an example of the present invention.

FIG. 13 is a schematic diagram of DCIs for on-off states of subframes according to an example of the present invention. Real on-off states operated by a cell are shown at the top, and on-off states operated by (i.e., specific to) a communication device are shown at the bottom. A period for receiving the DCIs is a frame (i.e., 10 subframes). At the beginning, the communication device receives a DCI in the subframe 0, and determines that an on-off state of the subframe 0 is "on", wherein the DCI (e.g., a bit "1" in the DCI) indicates that a next DCI exists. Accordingly, the communication device tries to detect a DCI in the subframe 1. The communication device receives a DCI in the subframe 1, and determines that an on-off state of the subframe 1 is "on", wherein the DCI (e.g., a bit "1" in the DCI) indicates that a next DCI exists. Similarly, the communication device tries to detect a DCI in the subframe 2. The communication device receives a DCI in the subframe 2, and determines that an on-off state of the subframe 2 is "on", wherein the DCI (e.g., a bit "0" in the DCI) indicates that a next DCI does not exist. The communication device stops detecting any DCI after the subframe 2. Accordingly, the communication device determines that the subframes 0-2 are in the on state, and subframes after the subframe 2 (i.e., the subframes 3-9) are in the off state. Thus, the communication device may perform communication operations in the subframes 0-2, and reduces power consumption (e.g., turns off) in the subframes 3-9.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit(s) and/or mixed circuit(s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides a method for handling an on-off state of a cell. The on-off state of the cell can be switched with a short transition time and low overhead. As a result, according to the efficient switching of the on-off state of the cell, throughput of the communication device can be improved, and power consumption of the communication device can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling an on-off state of a cell for a communication device, the method comprising:
   receiving a first downlink (DL) control information (DCI) in a first subframe from a network, wherein the first DCI indicates at least one first on-off state of at least one second subframe of a first cell of the network, and the first subframe is not comprised in the at least one second subframe;
   determining an on-off state of a third subframe of the first cell according to the first DCI, wherein the at least one second subframe comprises the third subframe;
   performing a blind decoding on a DL control channel of the third subframe of the first cell, if the on-off state of the third subframe of the first cell is not indicated by any DCI in a previous subframe; and
   determining the on-off state of the third subframe of the first cell according to a decoding result of the blind decoding.

2. The method of claim 1, further comprising:
   receiving a second DCI in a fourth subframe after the first subframe from the network, wherein the second DCI indicates at least one second on-off state of at least one fifth subframe of the first cell, and the fourth subframe is not comprised in the at least one fifth subframe; and
   determining the on-off state of the third subframe of the first cell according to the first DCI and the second DCI, wherein the at least one fifth subframe comprises the third subframe.

3. The method of claim 2, wherein the on-off state of the third subframe of the first cell is determined according to the first DCI, the second DCI and a majority rule.

4. The method of claim 3, wherein the on-off state of the third subframe of the first cell is determined according to the second DCI, if a consistent on-off state is not obtained according to the first DCI, the second DCI and the majority rule.

5. The method of claim 1, wherein the at least one second subframe is after the first subframe.

6. The method of claim 1, wherein the first DCI is received in the first subframe of the first cell, or is received in the first subframe of a second cell of the network.

7. The method of claim 6, wherein the first cell is a primary cell or a secondary cell, and the second cell is a primary cell or a secondary cell.

8. The method of claim 6, wherein one of the first cell and the second cell is operated in a licensed band, and the other one of the first cell and the second cell is operated in an unlicensed band.

9. The method of claim 1, wherein the first DCI is configured with a DCI format which is not limited to a legacy format defined in a 3rd Generation Partnership Project (3GPP) standard.

10. The method of claim 1, wherein the at least one first on-off state of the at least one second subframe of the first cell is indicated by a new field of the first DCI.

11. The method of claim 1, wherein the third subframe is in a plurality of subframes which is predetermined or is configured by the network.

12. The method of claim 1, wherein the at least one first on-off state is indicated by a plurality of bits for the at least one first on-off state and a time delay for indicating a distance between the first subframe and an initial subframe of the at least one second subframe.

* * * * *